J. BECHTEL 2,909,843

GEOMETRICAL INSTRUMENT

Filed Nov. 25, 1957

INVENTOR
*John Bechtel*

BY
*Sughrue & Rothwell*
ATTORNEYS

Fig. 3.

INVENTOR
John Bechtel
BY Sughrue & Rothwell
ATTORNEYS

Oct. 27, 1959

J. BECHTEL 2,909,843

GEOMETRICAL INSTRUMENT

Filed Nov. 25, 1957

INVENTOR
John Bechtel

BY Sughrue & Rothwell
ATTORNEYS

Oct. 27, 1959

J. BECHTEL 2,909,843

GEOMETRICAL INSTRUMENT

Filed Nov. 25, 1957

INVENTOR
John Bechtel

BY *Sughrue & Rothwell*
ATTORNEYS

Oct. 27, 1959  J. BECHTEL  2,909,843
GEOMETRICAL INSTRUMENT
Filed Nov. 25, 1957  11 Sheets-Sheet 9

INVENTOR
John Bechtel

BY
Sughrue & Rothwell
ATTORNEYS

United States Patent Office 2,909,843
Patented Oct. 27, 1959

2,909,843

GEOMETRICAL INSTRUMENT

John Bechtel, Lima, Ohio, assignor to John E. Cashman, Lima, Ohio

Application November 25, 1957, Serial No. 698,506

4 Claims. (Cl. 33—174)

This invention relates to improvement in geometrical instruments and more particularly to a geometrical instrument of the type used by draftsmen, architects, artists and the like for creating and reproducing geometrical designs.

In the work of drafting and especially in creating repetitious geometrical designs, it is necessary to produce and reproduce these designs with as great an accuracy as possible. It is also desirable to produce these designs as quickly as possible while requiring a minimum of drafting effort from the creator of the designs. It is the object of this invention to provide an instrument which will enable a draftsman, architect, or artist to create designs quickly and accurately with considerable less effort than has heretofore been required.

It is another object of this invention to provide an instrument with which an infinite number of designs may be created and then faithfully reproduced at any other portion of the paper or in any other position.

It is a further object of this invention to provide a geometrical instrument, which is useful in creating designs, that contains a plurality of scales, settings, and adjustments so that any designs created may be recreated in the same or varying form according to any predetermined pattern or program.

With these and other objects in view, the instrument includes a stationary supporting base which may be mounted on a drafting table or may be a portion of a drafting table, and this base carries thereon a drawing board which is movable back and forth in one direction. Also movably mounted back and forth in the same direction on this stationary base is a carriage member. This carriage member includes a portion extending across and above the drawing board and guiding thereon a blade assembly, having a pivotal blade. The board, carriage, and blade have suitable actuating means and may be adjusted to any position. A number of attachements for creating an infinite number of geometrical designs are provided for attaching to the pivoted blade. These attachments contain slidable templates which are either rectilinearly or rotatably slidable and they may have a scribing member incorporated therein. These attachments are foldable so that they may be folded out of the plane of the drawing surface while still being attached to the blade. The adjustments of the attachments are superimposed upon the adjustments of the board, blade, and carriage to obtain any desired type of setting for any desired type of template carried by the attachment.

For a better understanding of the invention, reference may be had to the following detailed description taken in connection with the accompanying drawings showing a preferred embodiment thereof.

Referring to the drawings, the instrument includes a stationary supporting base member 30. This base member includes a suitable rectangular support having two side rails 32 and 34, two end rails 36 and 38, and an intermediate supporting member 40. This base member also has four upright supports 35 to support it a suitable distance above a table or the like. The member 30 could also be integral with a supporting table. Each of the side rails 32 and 34 has a dovetail projection 42 thereon which serves as a slide support. Scales 44 and 46 are adjustably secured to the top of each side rail by means of screws 50 extending through slots 48 in the scales, see Fig. 1. A handle 51 is provided on each scale for slidably adjusting the same when the screws 50 are loosened.

A movable drawing board assembly 52 comprising a movable board 54, adapted to carry a paper 56 for marking thereon, is slidably journaled along the groove 58 between the side rails 32—34 and their scales 44—46 of the base member 30. The drawing board is actuated by means of a screw and nut type actuator having a screw 60 threadedly cooperating with a nut member 62 which is attached to the bottom of board 54 by screws 64. The actuating screw 60 may be turned by a handle 66 and the screw is suitably journaled in the base member 30 at 68.

Figure 1:
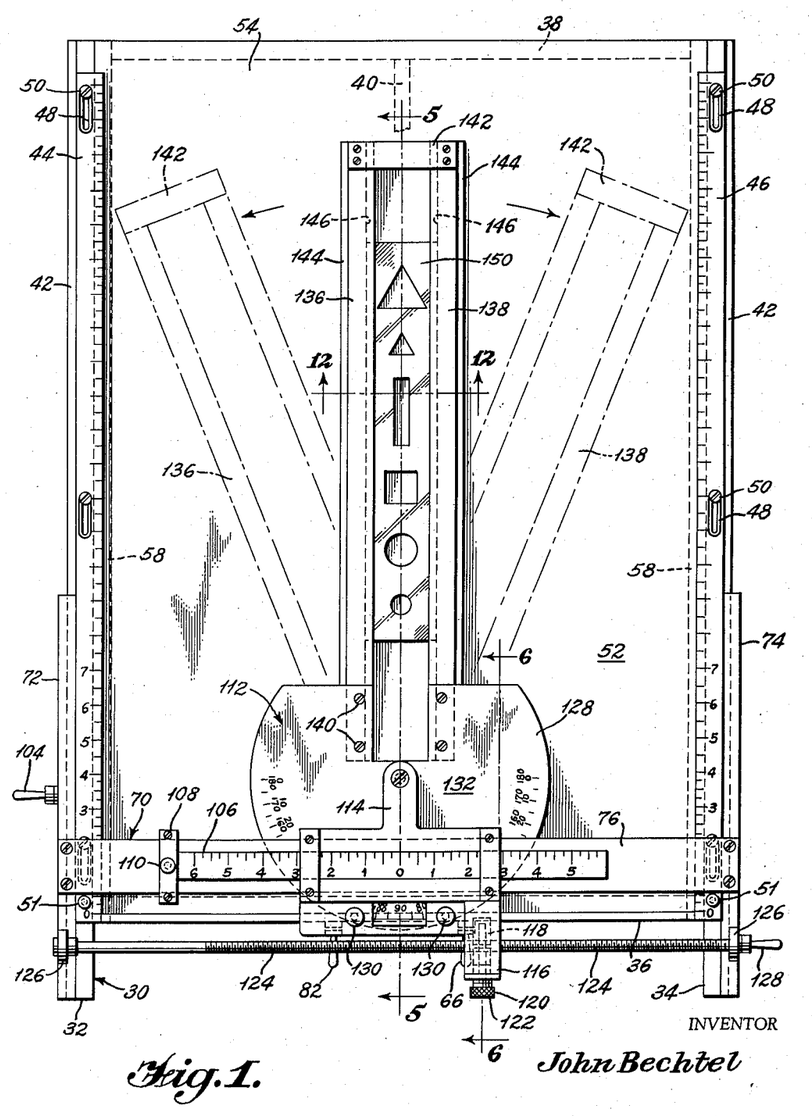
Fig. 1 is a top plan view of the instrument showing a representative template mounted in the blade assembly.
Figure 2:
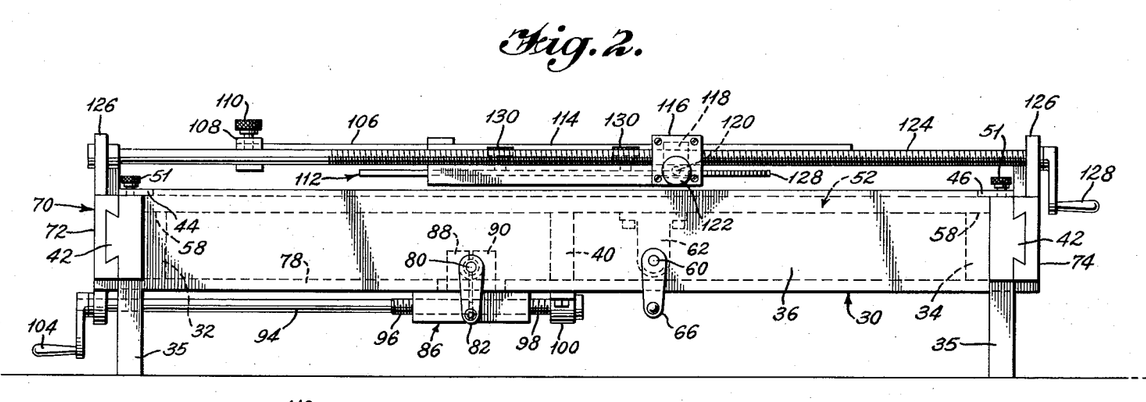
Fig. 2 is an end elevation view of the instrument.
Figure 3:
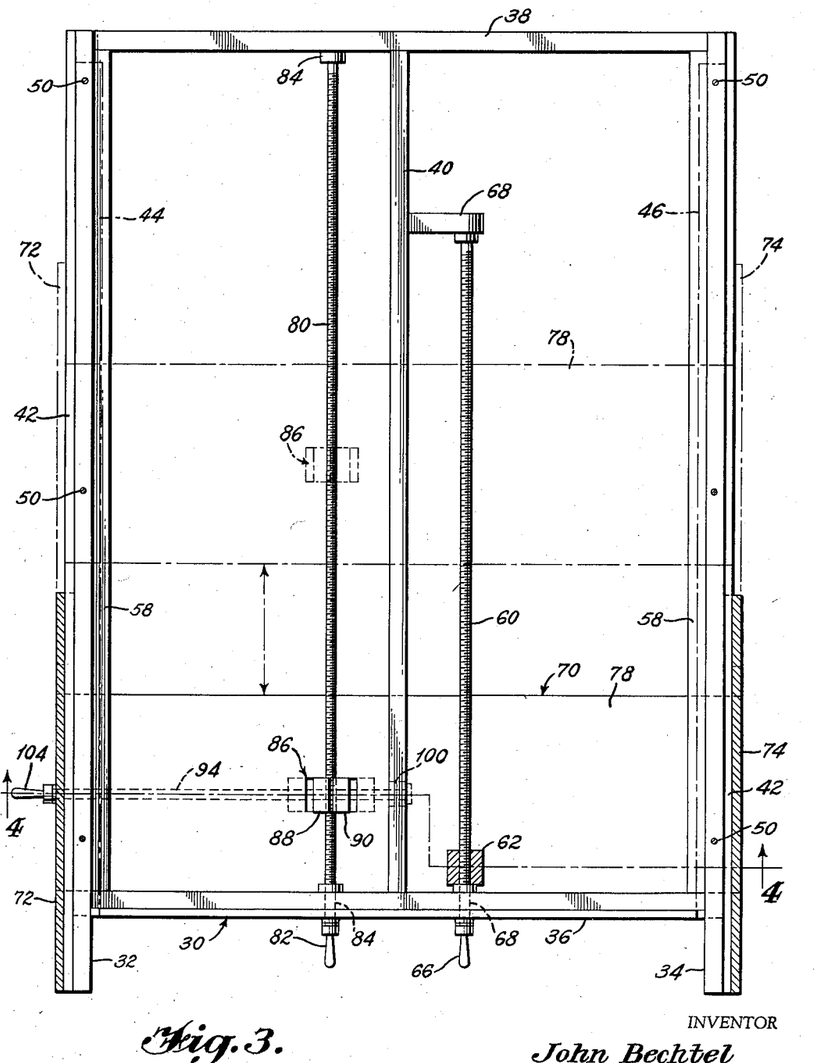
Fig. 3 is a view partially in section of the instrument with the drawing board and other parts removed for showing the actuating means for the board and the carriage.
Figure 4:
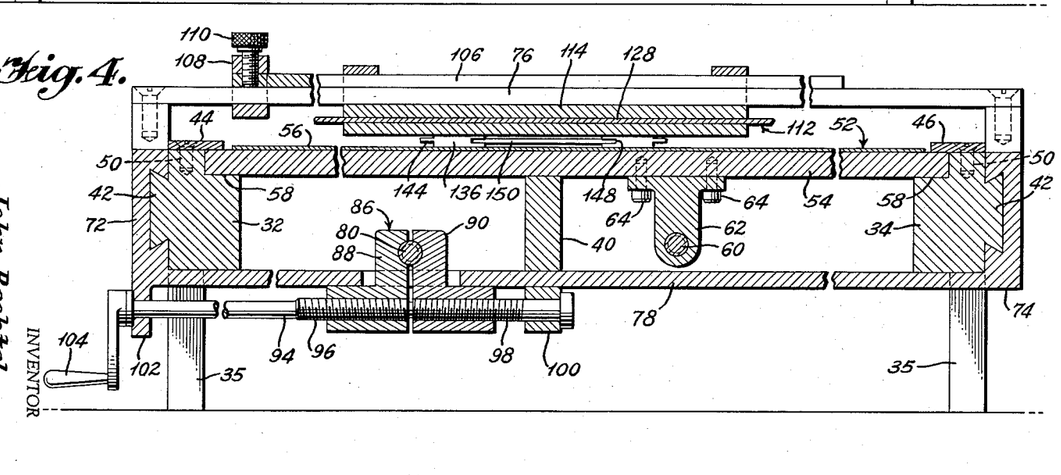
Fig. 4 is a sectional view taken along line 4—4 of Fig. 3.
Figure 5:
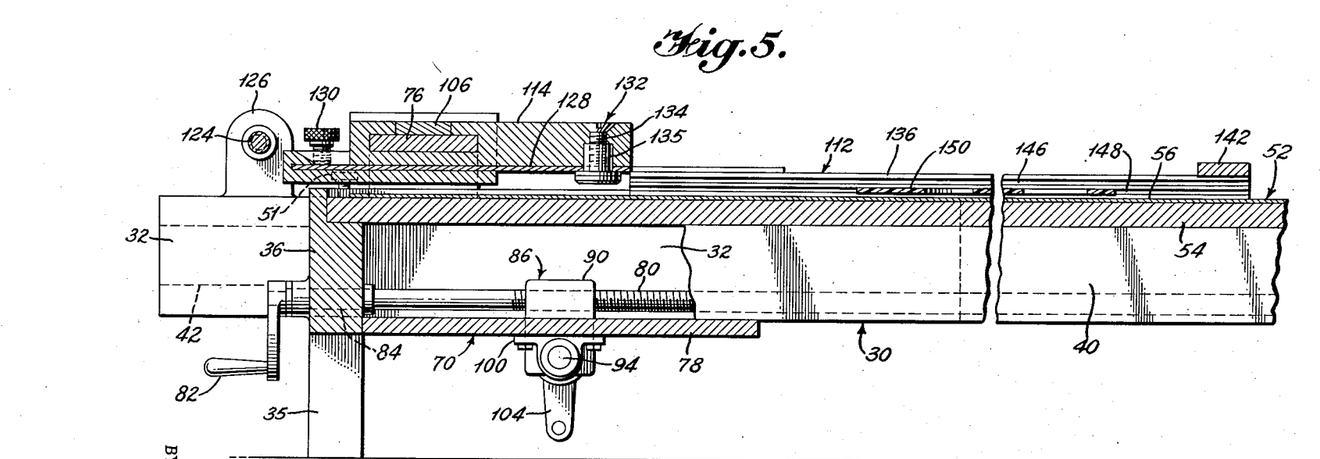
Fig. 5 is a sectional view taken along line 5—5 of Fig. 1.
Figure 6:
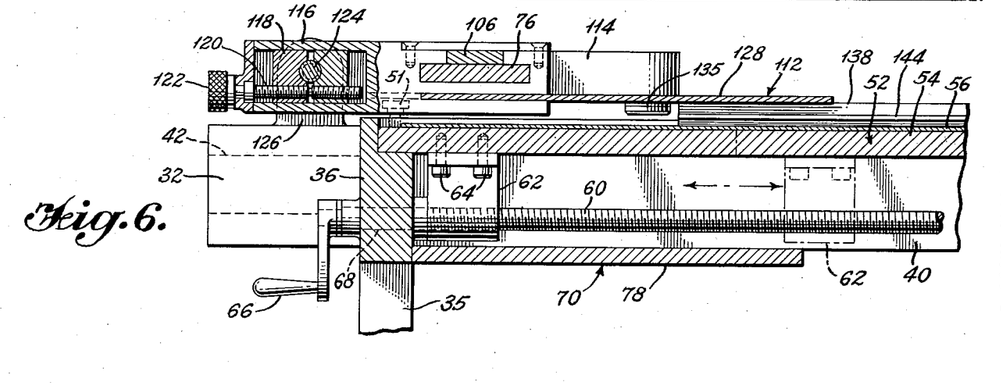
Fig. 6 is a sectional view taken along line 6—6 of Fig. 1.

A carriage assembly 70 is slidably mounted for movement along the side rails 32 and 34 as shown in Fig. 1. This carriage assembly includes a pair of side slides 72 and 74 connected by a top connection member 76, positioned above the drawing board, and a bottom connection member 78.

The carriage assembly may be driven by a screw and nut actuator having a screw 80 with a handle 82, which screw is suitably journaled at 84 in the base member 30. Connection is made from this screw 80 to the carriage assembly 70 by means of a split nut clamp 86 consisting of half nuts 88 and 90 which are moved toward or away from each other by the screw 94 having a pair of threaded portions 96 and 98, one portion of this screw contains left-hand thread and the other portion contains right-hand threads. Screw 94 is journaled in a depending lug 100 and a depending portion 102 of the side slide 72. This screw also is provided with an operating handle 104. By turning this handle the half nuts 88 and 90 may be made to either clamp the screw 80 and give the carriage 70 movement when the handle 82 is actuated or unclamp the screw 80 and allow the carriage 70 to be manually shifted from one position to another. This arrangement is provided in case it is desired to go from one position to a remote position and it would take too long to crank the screw to get this adjustment. The top connecting member 76 of the carriage assembly 70 carries an adjustably positioned scale 106. This scale is adjustably clamped to member 76 by a clamping screw 110 extending through bracket 108.

A blade assembly 112 is slidably movable across the face of the drawing board and includes a pivotally mounted blade. This assembly is slidably guided along member 76 by support projection 114 and may be moved by another screw and nut actuator. A lug 116 extending from support projection 114 houses a split nut 118 operated by screw 120 having opposite hand threads engaging each half of the split nut. A knurled knob 122 is provided for turning the screw 120. The split nut 118 is adapted to engage a traveling screw 124 journaled in upstanding lugs 126 on the carriage, and the split nut 118 is movable into or out of contact with the threads of the screw 124 by means of the reversibly threaded screw 120. When the split nut 118 is in contact with the screw threads, the screw 124 may be rotated to transversely move the blade assembly, and when the split nut 118 is not in contact with the screw threads the assembly 112 may be moved manually in a manner similar to the carriage 70 movement described above.

A protractor member 128 movable about pivot 132 may be adjustably clamped in any desired position by clamping screws 130. The pivot 132, which is also the protractor support, consists of a screw 134 threaded into a headed bushing 135.

Figure 12:
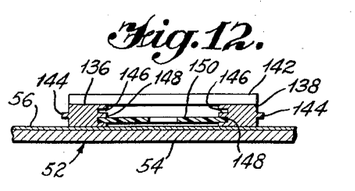
Fig. 12 is a sectional view taken along line 12—12 of Fig. 1.

The blade per se includes a pair of side members 136 and 138 attached by suitable screw means 140 to the protractor. The side members are connected together at their outer ends by cross member 142. The side members 136 and 138 have specially formed edges thereon, as shown in Fig. 12, for cooperating with the various attachments or templates which may be used to create the designs. These specially formed edges include an outer tongue 144 and a pair of inner edge grooves 146 and 148 in each side member. The designs are created at the edges of the attachments or templates and are not created at the edge of the blade. In other words, the blade is used principally as an attachment or template support and not as an edge to guide a drawing instrument. As shown in Fig. 1, the blade may slidably carry a transparent template 150 having any desired configuration of cutouts therein.

It can be seen that numerous geometrical designs can be created or reproduced by the adjustments of the carriage, board, and blade, in addition to the slidable template 150.

Figure 7:
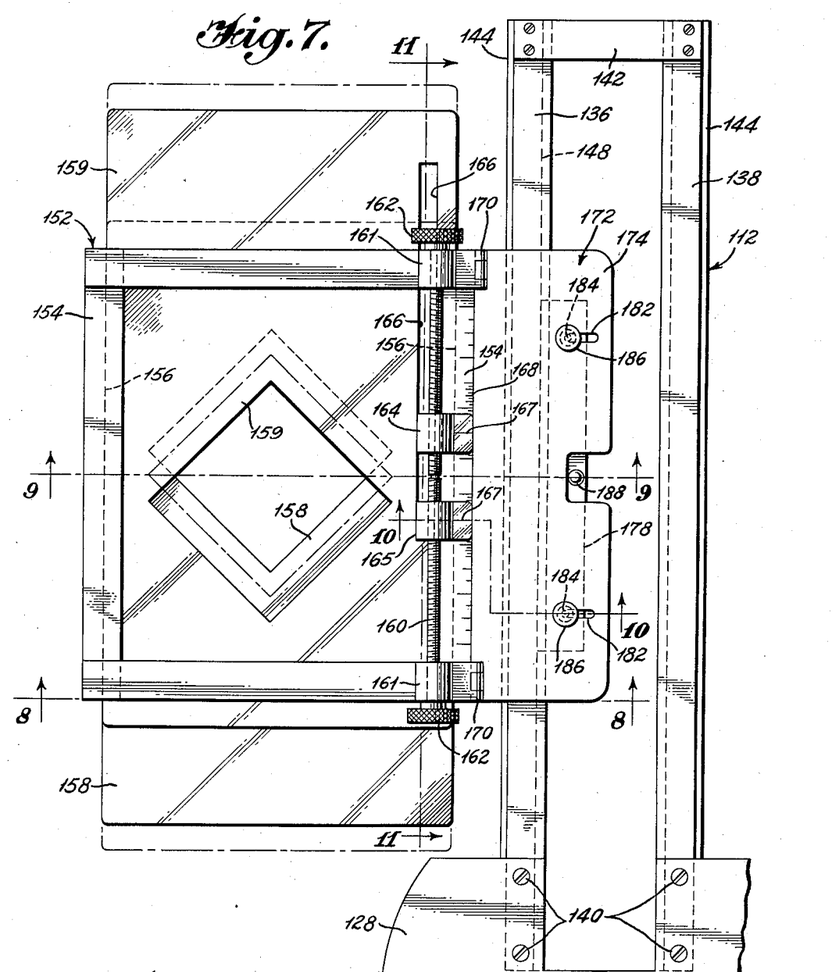
Fig. 7 is a top plan view of an attachment for the blade, this attachment having a pair of linearly movable templates therein.
Figure 8:
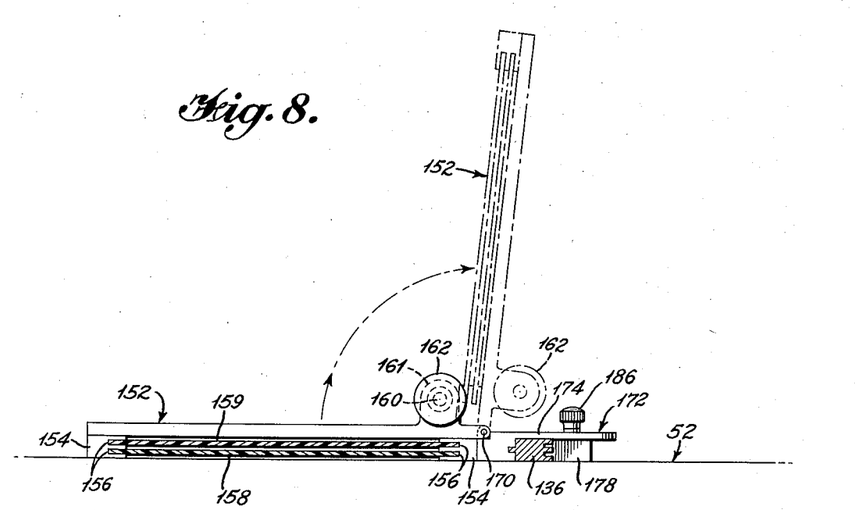
Fig. 8 is a sectional view along line 8—8 of Fig. 7.
Figure 9:
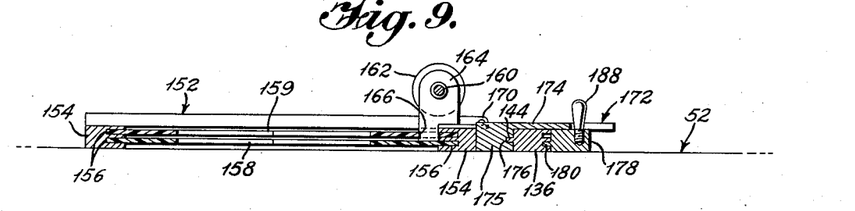
Fig. 9 is a sectional view along line 9—9 of Fig. 7.
Figure 10:
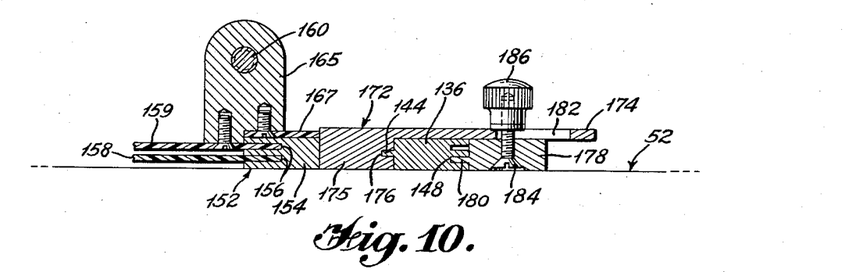
Fig. 10 is a sectional view along line 10—10 of Fig. 7.
Figure 11:
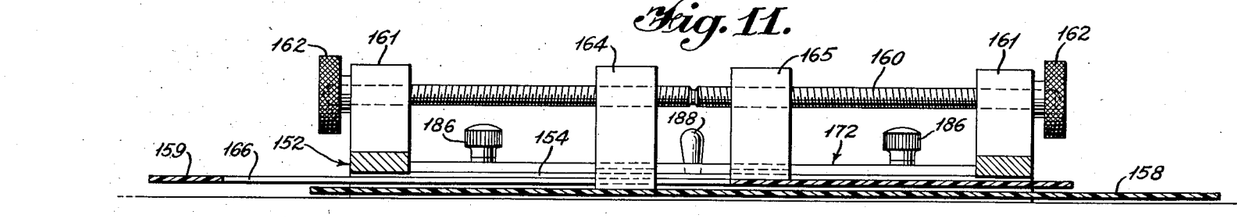
Fig. 11 is a sectional view taken along line 11—11 of Fig. 7.

It is generally desirable to have a greater flexibility in the type and kind of designs created than that provided by the single slidable template. For this purpose a number of attachments, novel in nature, may be provided. One type of attachment is shown in Fig. 7. This attachment includes a template support base member 152 with sides 154 having grooves 156 therein for carrying a pair of slidably movable superposed templates 158 and 159 having any suitable cutout therein, such as rectangles. The templates are movable with respect to one another simultaneously by means of a screw and nut actuator device. This screw and nut device consists of a screw member 160 journaled in suitable supports 161 and having oppositely threaded portions on both sides of the center thereof. Attached to each end of this screw 160 are actuating handles 162. Two nut members 164 and 165 engage the screw at the oppositely threaded portions and these nut members, in turn, are connected to each of the transparent templates 158 and 159. The overlying template 159 has a slot 166 therein so that the nut member 164 may extend therethrough to attach to the lower template. The nuts 164 and 165 each have a fiducial mark 167 thereon for reading against a scale 168 scribed on the base 152. This base member 152 and associated parts carried thereby are connected by hinges 170 to a clamping assembly 172. This clamping assembly includes a stationary clamping member 174 having a depending portion 175 with a groove 176 therein for engaging tongue 144 on the outside of either of the side members 136 or 138 of the blade assembly 112. A movable clamping member 178 is slidably connected to the stationary member 174 by clamping screws 184 with knurled heads 186 and these screws extend through slots 182 in stationary member 174. The movable member 178 has a tongue 180 for engaging the groove 148 in the inner edge of either side member 136 or 138 of the blade assembly 152. This clamping arrangement is shown more particularly in Figs. 8, 9, and 10. When the clamping screws 184 are loosened, the movable clamping member 178 may be moved, by handle 188 thereon, away from member 174 and the device placed over one of the sides of the blade, then the movable member 178 may be moved back toward member 174 until the tongue 180 engages groove 148 in the blade side member 136 and the clamping screws 184 may be tightened to securely clamp the attachment to the blade assembly 112. If it is desired to lift the template to better observe the work, or for any other reason, the hinges 170 provide the means for so doing.

Figure 13:
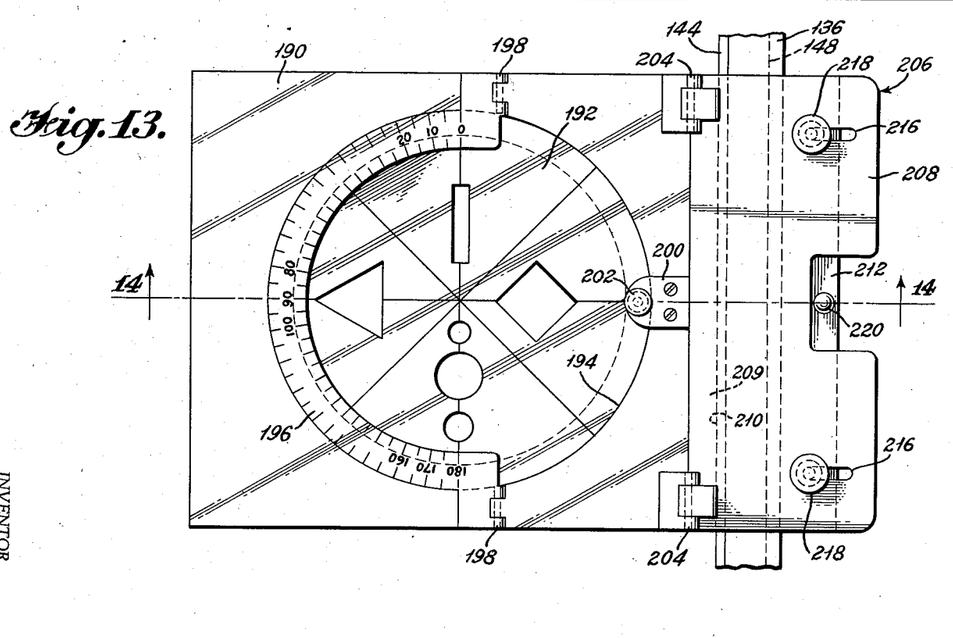
Fig. 13 is a plan view of another attachment for the blade, this attachment having a rotatably movable template therein.
Figure 14:
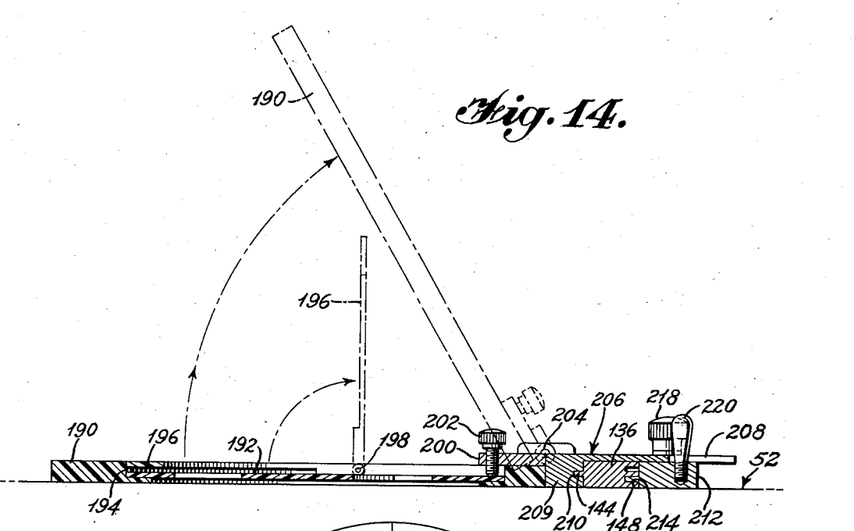
Fig. 14 is a sectional view taken along line 14—14 of Fig. 13.

Another attachment, which is useful in creating designs and includes a template mounted for rotational movement, is shown in Fig. 13 and the sections thereof. This attachment has a transparent circular template 192 carried in a suitable supporting base 190. The base has a circular flange 194 which functions as a peripheral bearing for any rotational movement of the template 192. An angular scale 196 of the protractor type is connected by hinges 198 to the base 190 and may be raised to allow the insertion or removal of the template 192. A clamping screw 202 extending from an overhanging lug 200 is utilized to securely hold the template in its adjusted angular position in the base 190. Screw 202 may be loosened and the template may be rotated varying amounts between successive use of the template.

The template assembly base 190 is hingedly connected by hinges 204 to a clamping assembly 206 which is quite similar to the clamping assembly 112 of the Fig. 7 attachment. This clamping assembly 206 comprises a stationary clamping member 208 having a depending portion 209 with a groove 210 therein for engaging the tongue 144 on the outer edge of the side member of the blade, and a movable clamping member 212 having a tongue 214 thereon for engaging a groove 148 on the inside of the side member of the blade. Suitable clamping screw means 218 extending through slots 216 in stationary member 208 are provided for locking the movable member 212 in position after it has been positioned to engage the blade side member and a handle 220 is provided for moving slidable member into and out of clamping position when the screw means 218 are loosened.

Figure 15:
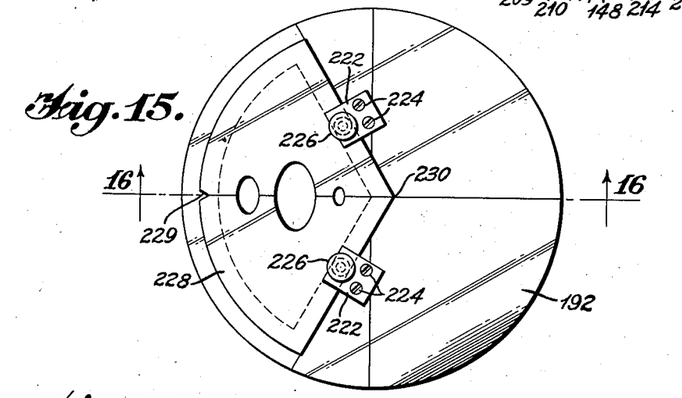
Fig. 15 is a plan view showing a modification of the template which may be used in the attachment of Fig. 13.
Figure 16:
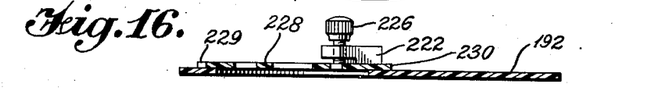
Fig. 16 is a sectional view taken along line 16—16 of Fig. 15.

It may be desirable to provide certain removable sections of the circular template and the structure for accomplishing this is shown in Figs. 15 and 16. The template 192 carries a pair of overhanging lugs 222 attached to the template by screws 224. Clamping screws 226 are threaded through the lugs 222 for the purpose of engaging and securing a template insert 228, having any desired cutout therein, on the face of the template 192. The template inserts are provided with a notch 229 and a point 230 on the periphery thereof for correctly positioning the same by lining up the template insert with reference marks on the template 192.

Figure 17:
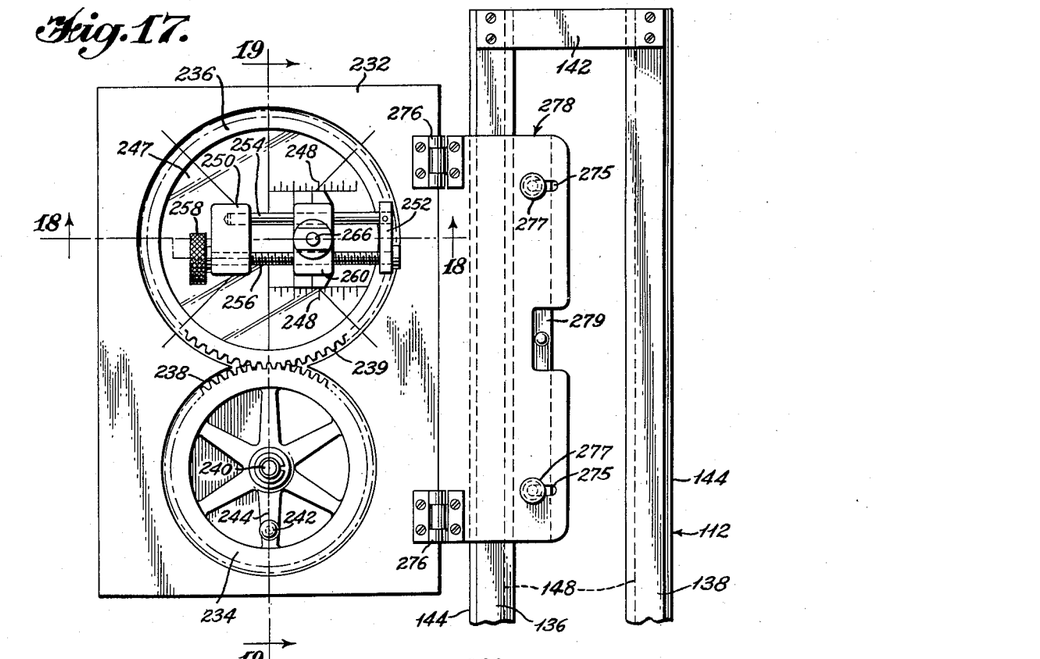
Fig. 17 is a top plan view of another embodiment of an attachment for the blade member, this attachment includes scribing means.
Figure 18:
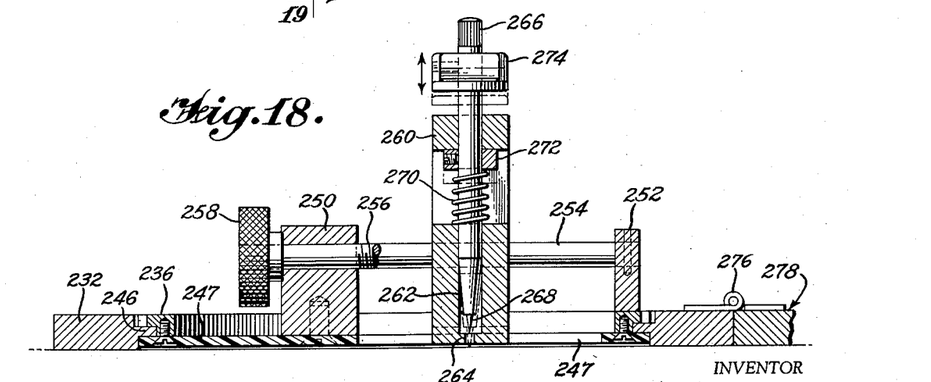
Fig. 18 is a sectional view taken along line 18—18 of Fig. 17.
Figure 19:
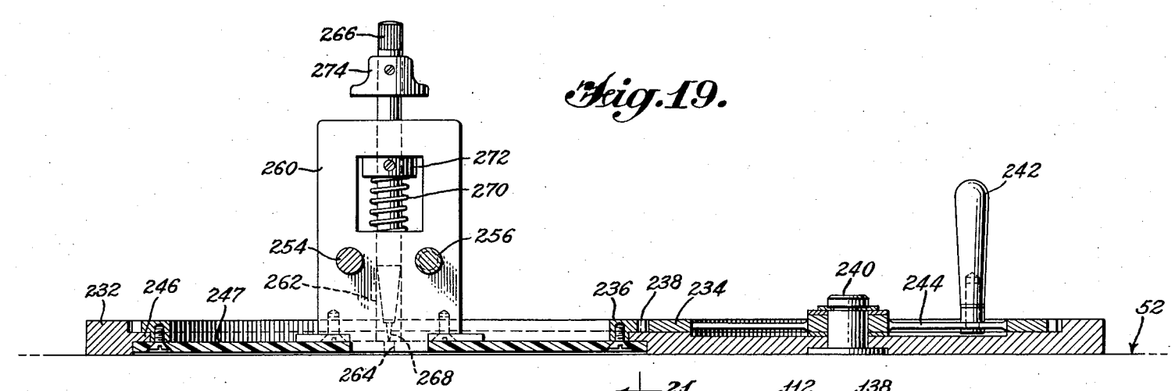
Fig. 19 is a sectional view taken along line 19—19 of Fig. 17.

Another desirable type of attachment which may be utilized when clamped to the blade member is the circular scriber attachment shown in Fig. 17 and the sections thereof. This attachment comprises a base member 232 hingedly connected by suitable hinges 276 to a clamping assembly 278. This clamping assembly is also similar to the clamping assemblies of the other attachments and includes a moveable clamping member 279 which is secured by a screw means 277 extending through slots 275 to clamp the assembly to the blade when the tongue and groove connections in opposite sides of the blade side member are engaged in the manner described previously. The base 232 of the circular scriber rotatably supports a pair of wheels 234 and 236. Wheel 234, which is journaled in pin member 240, has a handle 242 attached to a spoke 244 and gear teeth 238 on the periphery thereof. These gear teeth 238 engage with gear teeth 239 on the periphery of wheel 236 to rotate this wheel in any desired manner. Wheel 236 is journaled on its periphery by a circular tongue 246 on base 232. Wheel 236 has a transparent face 247 which carries the scribing means thereon, and this scribing means consists of a pencil or the like 266, with a scribing point 268, supported in a holder 260 having a cylindrical bore 262 with a small access opening 264 for the point of the pencil. Spring means 270 are adapted to cooperate against the holder 260 and an abutment washer 272 attached to the pencil for biasing the pencil upwards. An attachment 274 on the outer end of the pencil is provided so that the pencil may be forced downward by hand pressure against the bias to cause the point to engage the paper and to mark thereon, as shown in dotted lines in Fig. 18. The holder 260 is slidably mounted on a guide rod 254 and is actuated to various positions along this guide rod by screw means 256 journaled in two upstanding lugs 250 and 252. The screw 256 threadedly cooperates with a portion of the holder 260 to form a screw and nut type actuator. The screw may have an actuating handle 258.

Scale means 248 on the member 247 are provided so that the instrument may be adjusted to accurately scribe circles of any desired radius. It is evident that when this attachment is clamped to the blade assembly 112 the various movements of the blade, carriage and drawing board may be superimposed upon the scribing movements of the attachment to enable the attachment to scribe a variety of designs with maximum flexibility.

Figure 20:
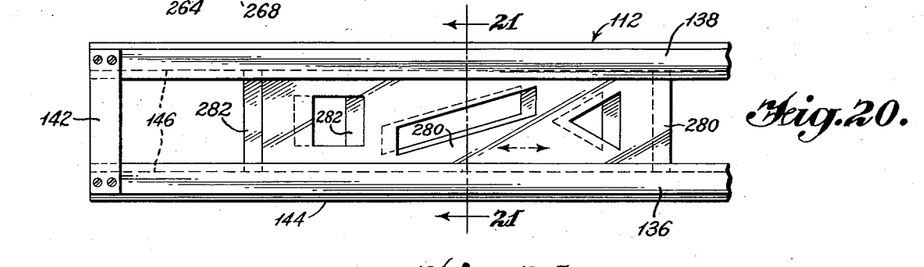
Fig. 20 is a top plan view of the blade having a pair of templates slidably mounted therein.
Figure 21:
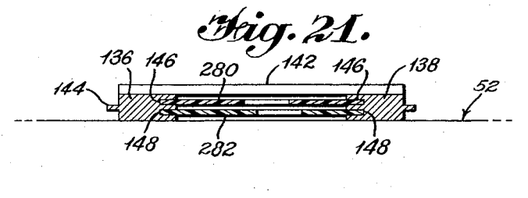
Fig. 21 is a sectional view taken along line 21—21 of Fig. 20.

Another further possibility of attachments for creating designs is the provision of a pair of slidable templates 280 and 282 engaged in the two grooves 146 and 148 in the inside of the blade assembly side members 136 and 138, as shown in Figs. 20 and 21. The two templates 280 and 282 are slidable with respect to each other and this movement may be superimposed upon any movement of the other elements to provide an intricate design of any desired type.

Figures 22, 23, 24:
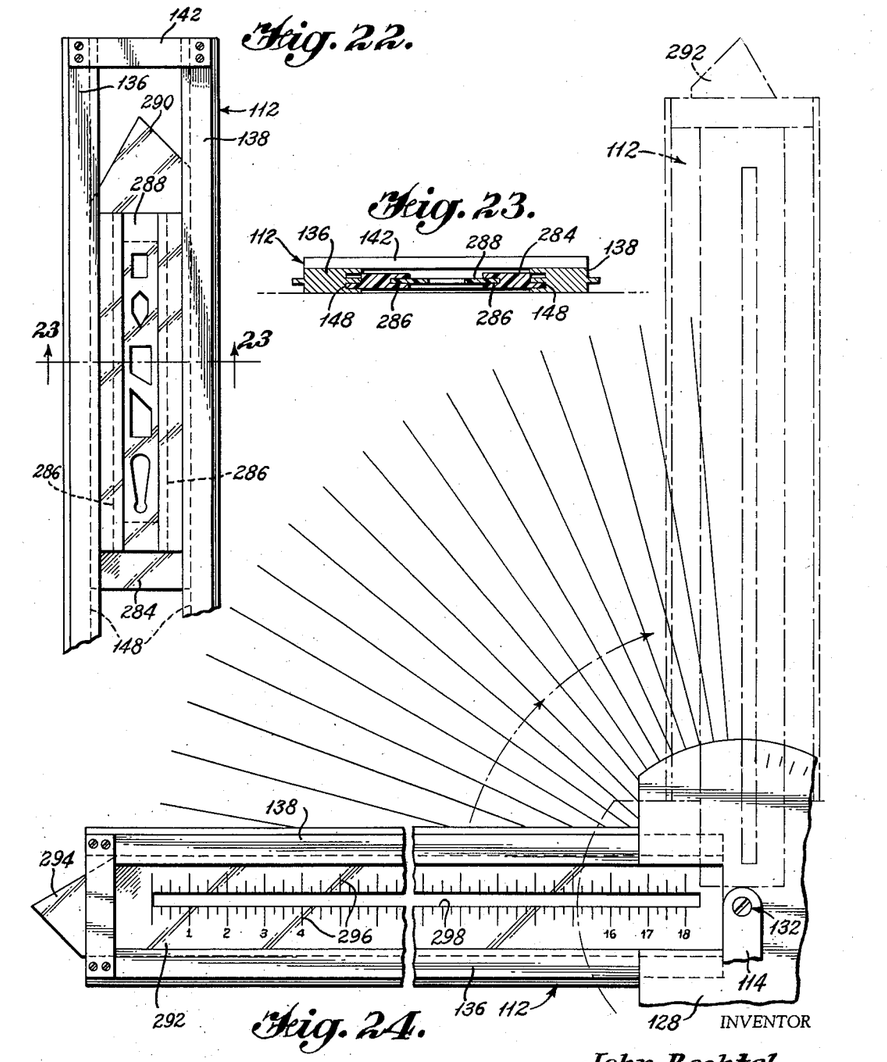
Fig. 22 is a top plan view of the blade showing an alternate form of template mounting therefor.
Fig. 23 is a sectional view taken along line 23—23 of Fig. 22.
Fig. 24 is a top plan view of the blade having a scale member mounted therein.

Figs. 22, 23 shown another form of attachment for creating designs. In this attachment the blade assembly 112 receives a template support 284 and this support can slidably receive various types of templates such as template 288 in grooves 286 therein. The top edge 290 of the support is cut to form 60/30 and 45 degree angle triangles and the template 288 may be slidably moved to provide any desired design.

Fig. 24 shows the pivoted blade assembly and how it may be moved to various angular positions. In this figure the blade assembly 112 carries another type of attachment between the opposite side members 136 and 138 thereof. This attachment may be a template 292 having a scale 296 inscribed on this template on opposite sides of slot 298 therein, which scale member may be used for various purposes in creating designs. The top 294 of the template 292 is cut similar to the top 290 of the template support 284 of Fig. 22 to provide the various triangles useful in drafting.

It is believed the foregoing description is clear enough to enable one skilled in the art to operate the device. However, a short description will summarize how the device and the various attachments may be utilized for creating an infinite number of geometrical designs. Any desired templates may be put into any of the attachments or the scribing member may be used and these movements may be superimposed upon any movements of the drawing board, the carriage member, and/or the blade assembly. Since scales are provided on all of these devices, the movements may be in definite scaled increments from the position of one template figure to the position of another template figure. With these attachments, the imagination of the user of the instrument is the only limitation upon the intricacy, type, and style of designs which may be created.

The applicant has disclosed a novel design-creating instrument and a plurality of attachments therefor. The foregoing illustrations are for the purpose of disclosing the invention only and are specific for this purpose; therefore, they are not considered to be limiting as the invention is intended to be limited only by the spirit and scope of the appended claims, wherein applicant is entitled to a reasonable range of equivalents.

I claim:

1. A geometrical instrument for creating designs comprising in combination: a supporting base having a pair of side rails with slide supports thereon; a drawing board slidably mounted on said side rails; a carriage also slidably mounted on said side rails for movement parallel with the movement of said drawing board; a blade assembly positioned above said board and mounted on said carriage for movement transverse to the movement thereof; and a blade pivotally attached to said blade assembly, said blade having a pair of side members mounted parallel to each other a spaced distance apart, said side members containing grooves on their inner edges for slidably supporting removable templates.

2. A device as defined in claim 1 further comprising screw and nut actuator means for moving said drawing board, said carriage, and said blade assembly, said nut for the actuator means of said blade assembly and carriage having means for selectively engaging its cooperating screw.

3. A device as defined in claim 2 wherein said blade assembly side members also include tongues on the outside edges thereof adapted to cooperate with clamping means for attachments which may be secured to said side members and wherein said pivoted blade is adjustably clamped by clamping screws in any desired adjusted position.

4. A device as defined in claim 3 wherein said supporting member carries scale means for adjusting the position of the carriage and the drawing board, said carriage carries scale means for adjusting the position of the blade assembly, and the pivoted blade carries an angular scale for adjusting the position of said blade.

(References on following page)

References Cited in the file of this patent

UNITED STATES PATENTS

| | | |
|---|---|---|
| D. 165,849 | Jordan | Feb. 5, 1952 |
| 1,296,886 | Waterloo | Mar. 11, 1919 |
| 1,443,088 | Pasquariello | Jan. 23, 1923 |
| 1,672,751 | Conti | June 5, 1928 |
| 2,290,585 | Gentry | July 21, 1942 |
| 2,403,633 | Browning | July 9, 1946 |
| 2,451,931 | Edelmann | Oct. 19, 1948 |
| 2,515,954 | Dyczynski et al. | July 18, 1950 |
| 2,702,944 | Lane et al | Mar. 1, 1955 |

FOREIGN PATENTS

| | | |
|---|---|---|
| 514,707 | Germany | Dec. 29, 1930 |
| 422,365 | Italy | June 16, 1947 |